H. E. HAYWARD.
CHAIN LINKS.
APPLICATION FILED MAR. 20, 1911.
1,022,942.
Patented Apr. 9, 1912.
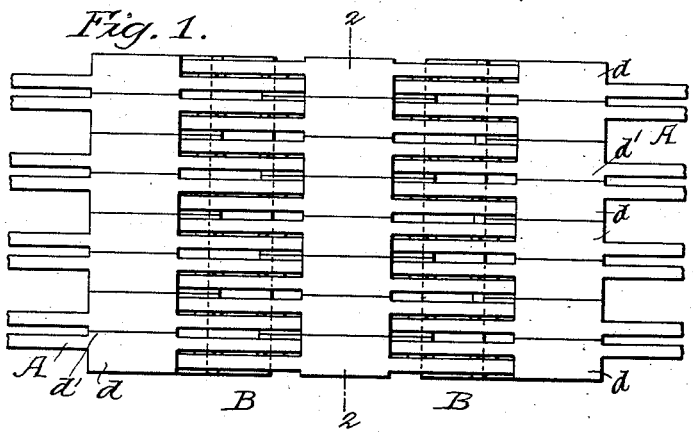
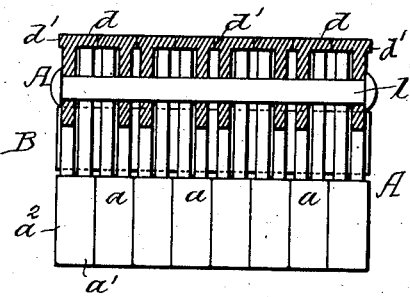
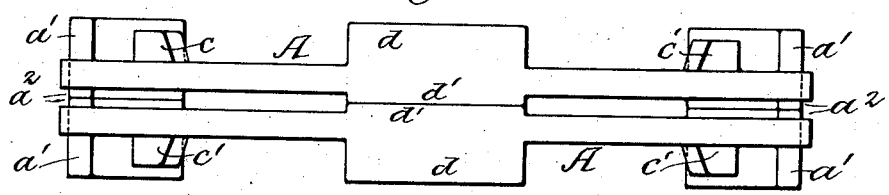
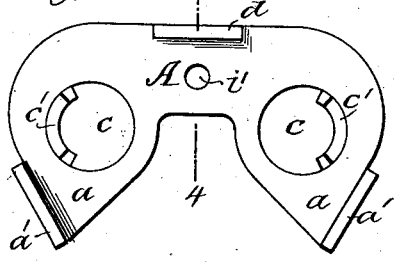
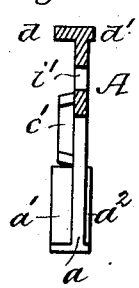
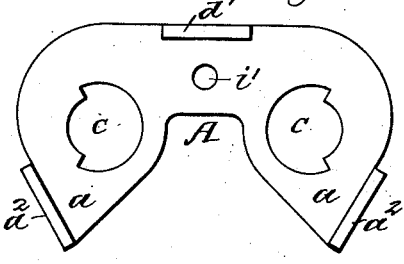
Witnesses—
William A. Rivoir
Wills A. Burrows
Inventor—
Henry E. Hayward.
by his Attorneys—

UNITED STATES PATENT OFFICE.

HENRY E. HAYWARD, OF PHILADELPHIA, PENNSYLVANIA, ASSIGNOR TO LINK-BELT COMPANY, OF CHICAGO, ILLINOIS, A CORPORATION OF ILLINOIS.

CHAIN-LINK.

1,022,942.  Specification of Letters Patent.  Patented Apr. 9, 1912.

Application filed March 20, 1911. Serial No. 615,543.

*To all whom it may concern:*

Be it known that I, HENRY E. HAYWARD, a citizen of the United States, residing in Philadelphia, Pennsylvania, have invented certain Improvements in Chain-Links, of which the following is a specification.

The object of my invention is to so construct the plates which form the links of a chain that they can be properly assembled and the chain made uniform throughout its entire length.

The invention is particularly adapted for use in connection with a chain in which the links are made of a series of flat plates each having teeth which engage the teeth of the sprocket wheels around which they pass. Heretofore, the plates have been assembled in pairs back to back and if there is any inequality in the plates, this inequality is increased throughout the width of the chain, making the chain vary in cross section at different points throughout its length. By my invention I can provide for the proper assembling of the links, even if the bodies of some of the plates are slightly out of true.

In the accompanying drawing:—Figure 1, is a plan view of a portion of a chain illustrating my invention; Fig. 2, is a sectional view on the line 2—2, Fig. 1; Fig. 3, is an enlarged view of a pair of link plates located back to back; Fig. 4, is a transverse sectional view through one of the link plates, on the line 4—4, Fig. 5; Fig. 5, is a face view of a link plate; and Fig. 6, is a rear view.

A is the link plate having, in the present instance, teeth $a$ and being perforated at $c$ for the reception of the pivot pins B, illustrated in Fig. 1. Each link plate is made of steel punched and struck up in the manner clearly shown in the drawings.

$c'$, $c'$ are segmental flanges bent from the plate at the pivot pin openings and these flanges form extended bearings for the pivot pins. In order to provide extended bearings for the working faces of the teeth, the flanges $a'$ are formed at right angles to the body of the teeth and project usually only on one side of the link plate; the opposite side or back of the plate being flat and free of projections.

$d$ is a flange at the upper edge of each link plate, forming a lateral projection, and this projection with the two projections $a'$ at the teeth form a three-point contact for the next plate, which has corresponding projections on its face. These projections are a sufficient distance apart to allow for the free movement between them of the pair of link plates of an adjoining link to which they are coupled, as indicated clearly in Fig. 1. In this instance the lateral projections $c'$ which form the extended bearings for the pivots are less in length than the projections $a'$ and $d$.

In order that the links may be properly assembled, I form two projections $a^2$ at the back of the link plate A; one projection being in line with one flange $a'$ at one end of the link and the other projection being in line with the other flange $a'$ at the opposite end of the link. I also form a projection $d'$ at the back of the link in line with the central flange $d$. The projections $a^2$ and $d'$ are sufficient, however, to bring the two-plate links, when assembled back to back, in absolute alinement so that if there is any imperfection in the body of the plate it will not affect the alinement, as it will be understood that in pressing a link of this type the dies can be so adjusted that the projections at the edges of the teeth and at the top of the link will always be of the same thickness, and thus the bodies of the plates can vary considerably without affecting the alinement, as it is very essential in the type of chain to which my invention relates that the alinement be as nearly perfect as possible.

The plates, when assembled to form a link, are secured together by a pin $i$ which passes through the holes $i'$ in the center of the link. The means of fastening may be varied without departing from the essential features of the invention.

I claim:—

As a new article of manufacture, a link plate of a chain having two teeth and two pivot pin openings; segmental flanges forming extended bearings at the pivot pin openings and projecting at one side only; and having projecting flanges forming extended bearings at the working face of each tooth and projecting on both sides of the plate; and also having a central flange extending on both sides of the plate, the flanges on one side being extended less than those on the other side of the plate.

In testimony whereof, I have signed my name to this specification, in the presence of two subscribing witnesses.

HENRY E. HAYWARD.

Witnesses:
WM. E. SHUPE,
WM. A. BARR.